April 7, 1931.   F. M. HARTFORD   1,799,980
APPARATUS FOR TREATING CERAMIC WARE
Filed April 10, 1930   2 Sheets-Sheet 1
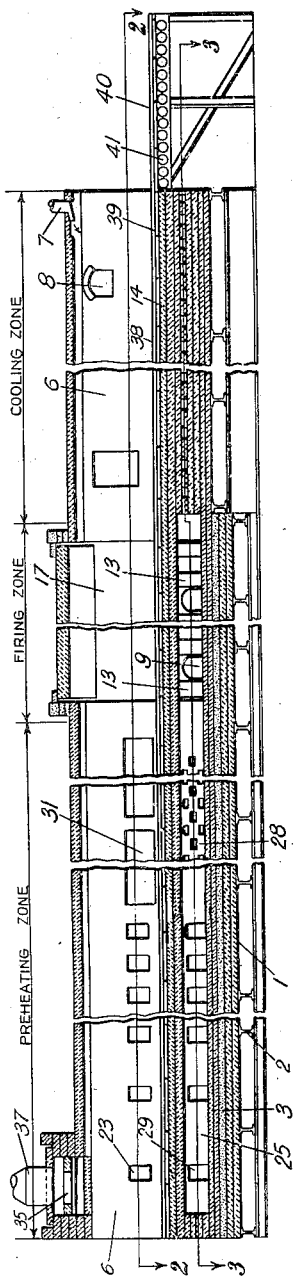
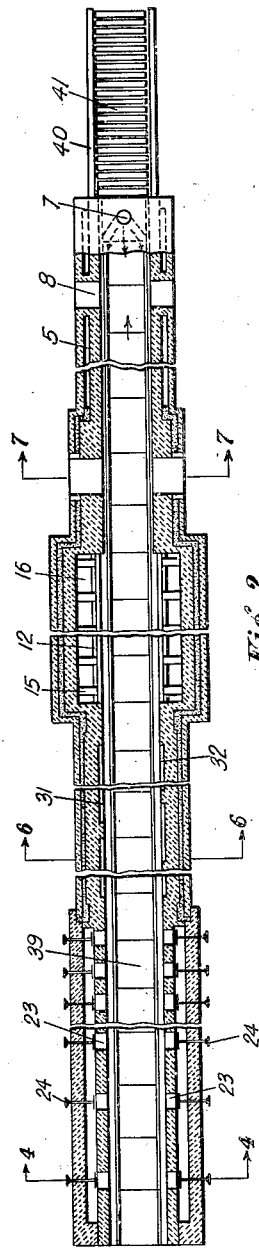
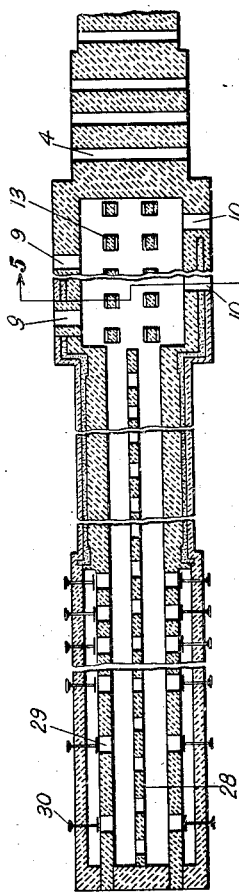
INVENTOR.
Frank M. Hartford.
BY
ATTORNEY April 7, 1931. F. M. HARTFORD 1,799,980
APPARATUS FOR TREATING CERAMIC WARE
Filed April 10, 1930 2 Sheets-Sheet 2
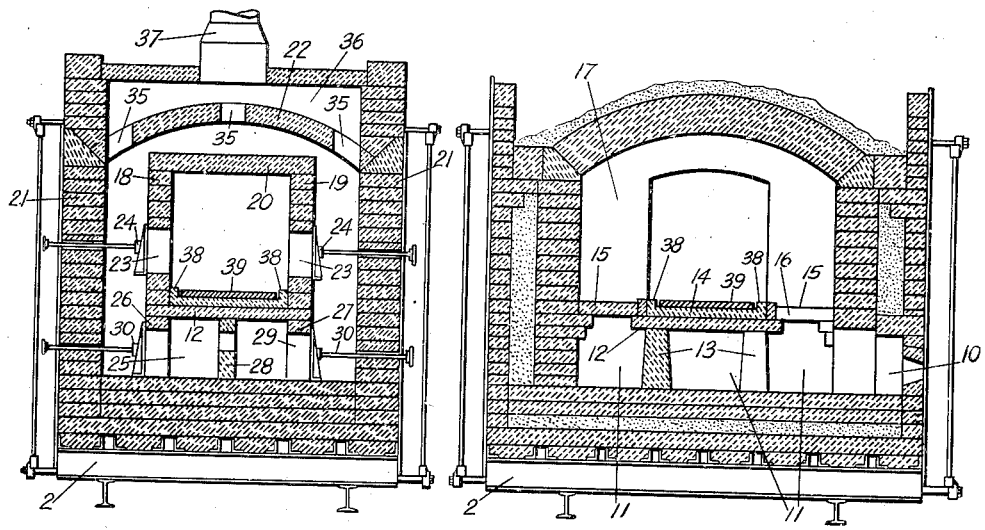
Fig. 4
Fig. 5
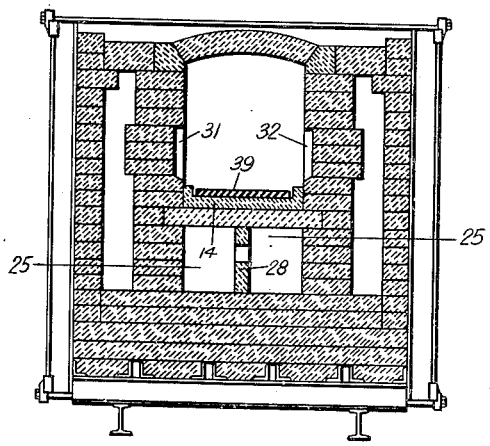
Fig. 6
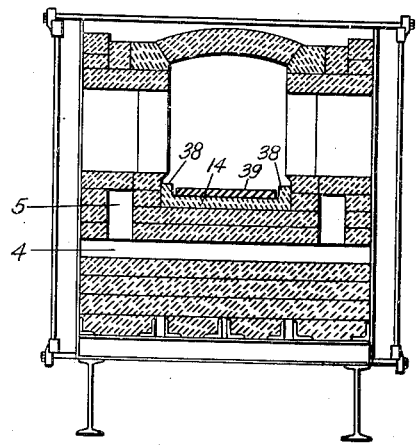
Fig. 7
INVENTOR.
Frank M. Hartford.
BY
ATTORNEY Patented Apr. 7, 1931

1,799,980

UNITED STATES PATENT OFFICE

FRANK M. HARTFORD, OF COLUMBUS, OHIO, ASSIGNOR TO THE HARROP CERAMIC SERVICE COMPANY, OF COLUMBUS, OHIO, A CORPORATION OF OHIO

APPARATUS FOR TREATING CERAMIC WARE

Application filed April 10, 1930. Serial No. 443,184.

My invention relates to apparatus for treating ceramic ware. It is particularly applicable to that type of kiln, generally referred to as a tunnel kiln, wherein ceramic ware mounted upon a series of conveying units is passed through a tunnel under successive subjection to preheating, firing and cooling conditions. It is not limited to kilns of this type and, in fact, in some of its phases, it is capable of application to other devices used in drying and heat-treating of various articles, such as driers, furnaces, etc.

In the past, many tunnel kilns have required the use of a series of cars and mechanically moving parts, such as wheels, wheel bearings et cetera which could not safely be subjected to high temperature conditions. With such structure, it has been customary to confine the heating medium to the space above the cars and, in many instances, it has been practically impossible to uniformly heat the ware setting and particularly the center of this setting adjacent the bottom thereof. Many prior kilns and their cooperating devices such as cars, rails and so forth have been unduly costly while, at the same time, they have frequently not been entirely satisfactory because of lack of uniformity in the heating of the ware.

One of the objects of my invention is to eliminate the rails and the costly understructure of the cars and provide a simple and cheap kiln structure with conveying units devoid of numerous moving parts. In this connection it is my aim to provide kiln structure and conveying units of such a nature that the ware being treated in the kiln may be more uniformly heated than has been possible with many such structures, this uniformity of heating being particularly improved at the center of the lower portion of the ware setting.

One of the objects of my invention is to provide a method and apparatus of simple construction, wherein the temperature influencing medium may be applied to the setting of ware in such a manner as to result in a more uniform heating of all parts of the ware setting.

Another object of my invention is to provide a kiln structure which is of unusually cheap and simple form but which, at the same time, permits of treating the ware with a degree of uniformity superior to many of the more expensively constructed kilns.

Another object of my invention is to provide a more perfect control for the heating medium in its application to the ware in various parts of the kiln, in order to insure a more effective and uniform treatment of the ware.

One of the features of my invention results from the fact that I have provided a construction which enables me to effectively apply heat to the ware conveying units from beneath and, at the same time, to directly apply heat to the ware carried on these ware conveying units.

Another feature of my invention arises from the fact that, in the application of my heat treating medium to the ware being treated, I am able to effectively control the relative proportions of the heat treating medium being applied to the ware both directly and indirectly.

Another feature of my invention arises from the fact that my kiln is so constructed that the furnaces may be readily located in a lower plane than the tunnel or chamber in which the ware is actually treated, so that the treating gases may find their way with a maximum of ease to and into the treating chamber. Furthermore, the flow of treating gases within this treating chamber is so controlled as to insure that it will be forced and guided into intimate contact with all parts of the ware setting.

The preferred embodiment of my invention comprises a kiln having a tunnel in combination with conveyor units. These conveyor units take the form of flat plates movable along the floor of the tunnel, this floor being provided with channels or flues beneath it for a portion of its length. These channels or flues are of such a nature that the treating medium may be conducted both along the bottom of the tunnel exterior thereto and into the interior thereof, the amounts of treating medium conducted in both directions being readily proportioned to accommodate operating conditions and to obtain desired results. In this preferred form, I desirably utilize conveyor units in the form of plates of refractory or similar material, these plates being disposed in end-to-end abutting relation and being caused to slide along the floor of the tunnel from which they are adapted to receive heat to be conducted into the superimposed ware setting. This embodiment of my invention also preferably comprises means for controlling the amount of treating medium which is applied to the bottom of the tunnel from beneath, with relation to the amount of treating medium which is applied directly to the ware by introduction into the tunnel interior.

The preferred embodiment of my invention is shown in the accompanying drawing wherein similar characters of reference designate corresponding parts and wherein:

Figure 1 is a vertical longitudinal section of a tunnel kiln built in accordance with my invention.

Figure 2 is a section taken on line 2—2 of Figure 1.

Figure 3 is a section taken on line 3—3 of Figure 1.

Figure 4 is a section taken on line 4—4 of Figure 2.

Figure 5 is a section taken on line 5—5 of Figure 3.

Figure 6 is a section taken on line 6—6 of Figure 2.

Figure 7 is a section taken on line 7—7 of Figure 2.

In the drawings, my invention is shown in application to a tunnel kiln. It comprises a main base portion 1 that may be mounted upon a steel structure that may be generally designated 2 and that may vary as to form. The portion of the base which lies beneath the preheating and firing zones is preferably insulated as at 3. The portion of the base which lies beneath the cooling zone is preferably provided with channels 4 and 5 that lighten the structure and permit free circulation of air to facilitate cooling.

The main tunnel of my kiln structure, that is, the tunnel through which the ware is passed, may be designated 6. The ware is conveyed through this tunnel on flat plates of refractory material disposed in end-to-end abutting relation, as will be described.

In the cooling end of the tunnel, it is preferably provided with a means, that may be designated 7, for introducing a cooling medium. A portion of this cooling medium may escape intermediate its point of introduction and the firing zone by openings which may be provided therein as at 8. However, I prefer that the escape of the major portion of any excess of the cooling medium be effected close to the firing zone, so that the temperature of the ware may be suddenly decreased in the higher ranges of the temperature thereof, where such sudden decrease may be effected without harmful results upon the ware. In this cooling zone the side walls of the ware tunnel project out into over-hanging relation to the floor to crowd the cooling medium into the ware, as shown in Figure 7.

In the firing zone, as shown best in Figures 1, 2, 3 and 5, the heating medium is designed to be introduced at a point below the ware tunnel, and ports 9 and 10 are provided upon opposite sides of the kiln which permit of the introduction of burning gases or other treating medium into a space 11 below the ware tunnel. As shown in Figure 5, the floor 12 of the ware tunnel is supported by pillars 13 which are spaced longitudinally of the tunnel structure so as to permit the free play of burning gases throughout the space 11.

The floor 12 may have, superimposed thereon, a runway 14, which is preferably of refractory material. Extending laterally from this floor structure are horizontal members 15 which serve to brace the floor structure from the side walls of the kiln but which are separated by spaces 16 (see Figure 2). This structure is such as to permit the burning gases which are introduced into the chamber 11 to rise freely against the bottom of the floor 12 and to also rise upon either or both sides of this floor 12 into the firing tunnel 17, where the gases are free to directly contact with the ware being passed through the firing zone. The ports 9 for the introduction of the burning gases are disposed in staggered relation to the ports 10 on the opposite sides of the kiln. It is not essential that this staggered relation be entirely uniform but such relation should be arranged as to avoid undesirable opposing pressures.

By reference to the drawings it will be noted that the ware tunnel is considerably wider in the firing zone than it is either in the preheating zone or the cooling zone. This is particularly desirable in the preheating zone and, in fact, it will be seen that other structural features have been embodied in the preheating zone of my kiln to insure that the preheating gases will be crowded into intimate contact with the ware as it passes through the preheating zone.

As illustrated in Figures 2 and 4, my ware tunnel throughout the preheating zone is not only smaller than the ware tunnel in the firing zone but it is entirely enclosed by means of walls 18 and 19 and a top 20, which parts cooperate with the floor of the tunnel to produce this enclosure. Adjacent that end of the kiln into which the ware enters, the walls 18 and 19 are spaced from the outer walls 21 of the kiln. These walls 18 and 19, which form the sides of the ware tunnel in the preheating zone, are provided with openings 23 leading into the space between this wall 19 and the adjacent wall 21. These openings 23 are under the control of dampers or valves which may be generally designated 24.

In this preheating zone, there is a channel 25 which extends beneath the ware bearing tunnel for substantially the full length thereof, communicating at one end with the space 11 in the firing zone. This supplemental channel is formed by the portions 26 and 27 of the walls 18 and 19, respectively. These portions serve to support the floor 12 of the ware bearing tunnel and are assisted in this by a central wall 28 of checker-work formation. The wall portions 26 and 27, like the walls 18 and 19 are provided with a plurality of spaced openings 29 which are under the control of dampers 30. These openings 29 also lead into the spaces between the wall portions 26 and 27 and the adjacent kiln wall 21.

The internal surfaces of the walls 18 and 19 in this preheating portion of the kiln are also provided with inset panels 31 and 32 as shown in Figures 1, 2 and 6. These inset panels are preferably of about one-half the height of the ware setting, extending from a point adjacent the bottom of the ware setting to a point slightly above the horizontal center of such settings. As shown in Figure 2, the inset panels 31 are disposed in staggered relation to the inset panels 32. The result of this structure is that the heating gases which pass through the ware tunnel in the preheating zone are caused to travel in a zig zag or tortuous horizontal path through the ware settings. It will be understood that any number of these inset panels may be used, if desired.

Adjacent the end of the kiln into which the ware enters, the top of the kiln is provided with a collecting chamber 36 that communicates with the spaces along the sides of the ware-bearing tunnels and the heating medium tunnel by means ports 35. This collecting chamber 36 in turn communicates with stack 37 which may be damper controlled, if desired.

The floor of my ware tunnel may take any form. In the form shown, it embodies the portion 14 which is provided with upwardly extending flanges 38 upon the edges thereof and this structure forms a trackway for a series of flat plates 39 which are preferably of refractory material. These flat plates are designed to serve as conveying units for the ware and are successively introduced into the ware tunnel in end-to-end abutting relation, being propelled throughout the tunnel in any desired manner.

The tunnel may further be provided with an extension runway 40 at its delivery end. This runway may embody a series of rollers 41 for the reception of the plates containing the finished ware. Obviously, suitable means may be provided for propelling the plates through the kiln and when desirable for closing the ends of the ware tunnel during the times when it is not necessary to remove plates from the tunnel or introduce plates thereinto.

In operation, the ware is placed upon the plates 39 and these plates are successively introduced into the preheating end of the ware tunnel. They are propelled at a proper rate of speed through the ware tunnel and, after passing through the firing zone and through the cooling zone, the plates with ware thereon emerge from the kiln in finished condition.

The burning gases are introduced in the firing zone through the ports 9 and 10 and part of these gases rise upwardly through the spaces 16 and pass through the ware setting in the firing zone. Under the influence of the draft from the stack, the gases which have thus risen into direct contact with the ware, pass into and through the preheating end of the tunnel. In the course of this travel, they enter the inset panels 31 and 32 and then are diverted inwardly towards the center of the ware setting by the partitions which separate these inset panels from each other. The staggered relation of these panels on opposite sides of the tunnel cause the preheating gases to travel in a horizontal tortuous path through the wear settings.

Simultaneously with this action, a part of the burning gases remains beneath the floor 12 of the ware tunnel and travels from the space 11 into the channel 25 which is beneath the floor 12 in the preheating zone. This subjects the floor 12 to a substantial heating action and the heat thus imparted is conducted upwardly through the floor structure and through the plates 39 into the ware settings.

The dampers or valves 24 and 30 disposed respectively, in series along the ware tunnel and the channel 25 in the preheating zone make possible a complete regulation of the proportionate amounts of heating gases which is to be distributed through this portion of tunnel and the channel 25 in the preheating zone. It will be appreciated that the draft produced by the stack is normally effective to draw the heated gases both from the ware bearing tunnel and the gas tunnel therebeneath to any desired proportionate extent, this draft upon both of these parts being regulated by the dampers or valves 24 and 30. These gases pass into the spaces beside the ware-bearing tunnel and the treating medium tunnel and thence through the opening 35 into the collecting chamber 36 and then up the stack 37.

It will be seen that I have provided a novel kiln structure wherein the ware entering the preheating zone may be subjected to the direct application of a heating medium and, at the same time, may be subjected to the indirect application of the heating medium at the bottom of the ware, which is always the portion thereof most difficult to heat. Furthermore, the amount of heating medium directly applied and the amount indirectly applied may be regulated. Furthermore, the heating medium which is directly applied to the ware in the preheating zone is caused to travel in a horizontal tortuous path therethrough and is more or less crowded towards the lower portions of the setting so that those portions of the setting which are ordinarily most difficult to heat will be effectively heated.

It will also be apparent that the inset panels which are utilized may be of such height that the upper portions of the ware setting which are most subject to toppling or leaning will be precluded from such toppling or leaning by the juxtaposed wall structure. It will, likewise, be obvious that the ware passing into the firing zone will be subjected to the heating gasses and that, when this ware passes into the cooling zone, the cooling air will be crowded by the overhanging walls into intimate contact with the ware setting to insure effective cooling of the ware. The cooling zone itself will be further cooled by the channels provided in the base thereof, which serve to facilitate circulation of air therethrough. Likewise, the ware emerging from the firing zone will be immediately subjected to cooling action, so as to produce a sudden and comparatively large drop of temperature in the higher ranges, at which such a sudden drop may be safely effected.

Having thus described my invention, what I claim is:

1. Apparatus for treating ceramic ware comprising a preheating zone, a firing zone and a cooling zone, superimposed tunnels in said preheating zone and firing zone means for conveying the ware to be treated through the upper tunnel of said preheating zone and firing zone and means for effecting the delivery of a heating medium through both of said tunnels in any desired proportion.

2. Apparatus for treating ceramic ware comprising a preheating zone, a firing zone and a cooling zone, superimposed tunnels in said preheating zone, means for conveying the ware to be treated through the upper tunnel of said preheating zone, and means for effecting the delivery of a heating medium through both of said tunnels in any desired proportion.

3. Apparatus for treating ceramic ware comprising a main tunnel embodying a preheating zone, a firing zone and a cooling zone, a supplemental tunnel beneath said preheating zone and said firing zone, and means for directing heating medium through both of said tunnels.

4. Apparatus for treating ceramic ware comprising a main tunnel, conveyor plates designed to slide along the floor of said tunnel, and means for delivering the heating medium both directly into said tunnel and in contact with the under side of said floor.

5. Apparatus for treating ceramic ware comprising a tunnel, plates for carrying ware through said tunnel, and means for supplying heat both directly into said tunnel and to the under side of said plates.

6. Apparatus for treating ceramic ware comprising a main preheating tunnel, a supplemental tunnel beneath said main preheating tunnel, means for delivering the heating medium into both said main and supplemental tunnel, damper controlled exit ports in the walls of said main preheating tunnel, and damper controlled ports in said supplemental tunnel.

7. Apparatus for treating ceramic ware comprising a tunnel kiln having a preheating zone, a firing zone and a cooling zone, a floor in said tunnel kiln, plates slidable along said floor for conveying ceramic ware, and means for introducing a heating medium into the firing zone of said tunnel kiln beneath said floor and permitting it to rise upwardly into direct contact with the ware.

8. Apparatus for treating ceramic ware comprising a tunnel kiln having a preheating zone, a firing zone and a cooling zone, a floor in said tunnel kiln, plates slidable along floor for conveying ceramic ware, means for introducing a heat treating medium into the firing zone of said tunnel kiln beneath said floor and permitting a portion of it to rise upwardly into direct contact with the ware and a portion of it to rise upwardly into contact with the floor of said kiln, a closed tunnel leading from said firing zone through the preheating zone, a closed tunnel leading from said firing zone along beneath last named closed tunnel, and means for directing the products of combustion through both of said closed tunnels.

9. Apparatus for treating ceramic ware comprising a tunnel kiln having a preheating zone, a firing zone and a cooling zone, a ware tunnel, a tunnel for conducting heating medium along beneath the ware tunnel so as to transmit heat upwardly therethrough, conveyor elements slidable along the bottom of said ware tunnel and adapted to receive heat from said bottom and transmit it to the ware setting, and means for conducting a heating medium upwardly into that portion of the firing zone above said conveyor element and into direct contact with the ware setting.

10. Apparatus for treating ceramic ware comprising a tunnel kiln having a peheating zone, a firing zone and a cooling zone, a ware tunnel, a tunnel beneath said ware tunnel for conducting a heating medium along beneath said ware tunnel so as to transmit heat upwardly through the bottom of said ware tunnel, conveyor elements slidable along the bottom of said ware tunnel, means for conducting a heating medium upwardly from the firing zone into direct contact with the ware in the firing zone and thence into the ware tunnel in the preheating zone.

11. Apparatus for treating ceramic ware comprising a tunnel through which the ware passes, a tunnel beneath said first-named tunnel, and means for supplying a heating medium and dividing it so that a portion of such heating medium passes through the ware tunnel and a portion thereof passes through the tunnel beneath said ware tunnel.

12. Apparatus for treating ceramic ware comprising a ware tunnel in the pre-heating zone, plates slidable along the bottom of said ware tunnel, said plates being adapted to transport the ware through said ware tunnel, means for passing a heat treating medium through said ware tunnel and in direct contact with the ware, and means for simultaneously delivering heat to the ware by conduction through said plates from beneath.

13. Apparatus for treating ceramic ware comprising a ware tunnel in the pre-heating zone, plates slidable along the bottom of said ware tunnel, said plates being adapted to transport the ware through said ware tunnel, means for passing a heat treating medium through said ware tunnel and in direct contact with the ware, and means for simultaneously applying a heating medium to the floor of said tunnel for conveying heat by conduction upwardly into the ware setting.

In testimony whereof I, hereby, affix my signature.

FRANK M. HARTFORD.